United States Patent Office 2,750,387
Patented June 12, 1956

2,750,387

BASICALLY SUBSTITUTED DERIVATIVES OF DIARYLAMINOBENZAMIDES

Carl Peter Krimmel, Mundelein, Ill., assignor, by mesne assignments, to G. D. Searle & Co., Skokie, Ill., a corporation of Delaware No Drawing. Application November 25, 1953,
Serial No. 394,487

7 Claims. (Cl. 260—294)

My invention relates to a new group of amides of N,N-diarylanthranilic acids and, specifically, to the basically substituted o-diarylaminobenzamides of the structural formula

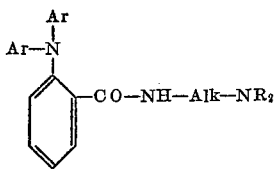

and the non-toxic salts thereof, wherein Ar is an aryl radical, Alk is a lower alkylene radical separating the two nitrogen atoms attached thereto by at least two carbon atoms and $NR_2$ is either a lower dialkylamino radical or a nitrogen-containing heterocyclic radical attached through a nitrogen in the heterocycle to the radical Alk.

In the above structural formula, Ar is a lower aryl radical and, preferably, a monocyclic aromatic hydrocarbon radical such as phenyl, tolyl, xylyl, ethylphenyl, or cumyl. The radical Alk is a straight-chained or branch-chained hydrocarbon radical such as ethylene, propylene, butylene, amylene, or a polymethylene radical such as trimethylene or octamethylene. The radicals R and R' are lower alkyl radicals of the straight-chained or branch-chained type such as methyl, ethyl, propyl, butyl, amyl, and hexyl. The radicals R and R' can also be combined to form a lower alkylene chain containing 4 to 5 carbon atoms as in the case of the pyrrolidino and piperidino radical. Other valuable compounds are obtained where $NR_2$ represents a heterocyclic radical such as a 2,5-dimethylpyrrolidino, 2,6-lupetidino, morpholino, thiamorpholino or piperazino radical.

The bases described herein form salts, which are non-toxic in therapeutic dosage, with a variety of inorganic and strong organic acids such as phosphoric, hydrochloric, hydrobromic, hydriodic, sulfamic, acetic, maleic, malic, succinic, tartaric, citric, ascorbic, gluconic, benzoic, cinnamic, or related acids. They also form quaternary ammonium salts with a variety of organic esters of sulfuric, hydrohalic, and aromatic sulfonic acids. Among such esters are methyl chloride, bromide, and iodide; the ethyl halides, propyl halides, butyl halides, isobutyl halides, benzyl halides, phenethyl halides, naphthylmethyl halides, dimethyl sulfate, methyl benzenesulfonate, ethyl toluenesulfonate, ethylene chlorohydrin, ethylene bromohydrin, the propylene halohydrins, allyl chloride, methallyl bromide, and crotyl bromide.

The compounds of my invention are valuable as intermediates in organic synthesis. They are active medicinal agents showing a number of valuable pharmacological properties. They have a quinidine-like regulatory action on the heart and produce peripheral vasodilatation. They also have a spasmolytic effect which is particularly pronounced in the case of musculotropic spasms.

My invention will be illustrated in further detail by the examples below. However, these examples are not to be construed as limiting it in spirit or in scope. Quantities of materials are given in parts by weight, temperatures in degrees centigrade (° C.) and pressures in millimeters (mm.) of mercury.

Example 1

A mixture of 50 parts of N,N-diphenylanthranilic acid, 82 parts of thionyl chloride, and 800 parts of carbon tetrachloride is refluxed on the steam bath for 3 hours. The excess volatile reagents are removed by low temperature vacuum distillation and the acid residue is used without further purification in the following reaction.

The acid chloride residue is dissolved in 800 parts of anhydrous ethyl ether. To the ethereal solution 20 parts of β-diethylaminoethylamine are slowly added with stirring. The resultant yellow precipitate is extracted with dilute hydrochloric acid. The aqueous phase is separated and made alkaline. The released base is ether extracted, dried over anhydrous potassium carbonate, filtered, ether stripped, and vacuum distilled. The N-(β-diethylaminoethyl)-o-diphenylaminobenzamide is thus obtained as an orange syrup at about 230–240° C. and 0.6 mm. pressure. This base can be solubilized in warm aqueous citric acid solutions. It has the structural formula

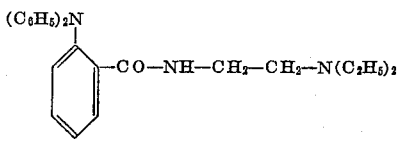

Example 2

The acid chloride residue obtained from 50 parts of N,N-diphenylanthranilic acid is dissolved in 700 parts of anhydrous ethyl ether. The stirred ethereal solution is treated by gradual addition with 17 parts of γ-dimethylaminopropylamine. A yellow precipitate forms which is extracted with dilute hydrochloric acid. The extract is made alkaline and extracted with ether. This extract is dried over anhydrous potassium carbonate, filtered, ether stripped, and vacuum distilled. At about 250° C. and 1.5 mm. pressure, the N-(γ-dimethylaminopropyl)-o-diphenylaminobenzamide is collected as a yellow syrup.

To 13 parts of the above base in 700 parts of anhydrous ethyl ether is added with stirring one equivalent of a 25% solution of hydrogen chloride in an anhydrous isopropanol. The pale, yellow, hygroscopic precipitate is filtered at once, ether washed and immediately transferred to a vacuum desiccator. After thorough removal of the ether, the product is recrystallized by dissolving at room temperature in a minimum quantity of butanone. Upon standing for 10 to 20 minutes, the hydrochloride separates as a white, crystalline powder. It is washed with butanone and thoroughly dried in a vacuum desiccator. The non-hygroscopic hydrochloride thus obtained melts at about 95–98° C. It has the structural formula

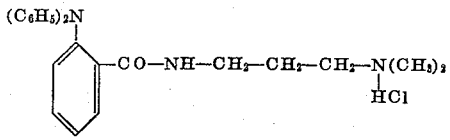

Example 3

The acid chloride residue, obtained from 100 parts of N,N-diphenylanthranilic acid is dissolved in 1400 parts of anhydrous ethyl ether. To the stirred ethereal solution, 44.8 parts of γ-diethylaminopropylamine are added dropwise. A yellow precipitate forms which is extracted with dilute hydrochloric acid. The extract is separated, made alkaline and extracted with ether. The ether extract is dried over anhydrous potassium carbonate, filtered, evaporated, and vacuum distilled. On vacuum distillation at 237–243° C. and 1 mm. pressure, N-(γ-diethylaminopropyl)-o-diphenylaminobenzamide is obtained as a pale, yellow syrup. It has the structural formula

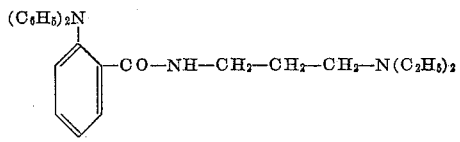

*Example 4*

A mixture of 55 parts of N-(2,4-xylyl)-N-phenyl-anthranilic acid, 82 parts of thionyl chloride, and 800 parts of carbon tetrachloride is refluxed on the steam bath for 3 hours. The excess volatile reagents are distilled off under vacuum at low temperature. The acid chloride residue thus obtained is dissolved in 700 parts of anhydrous ethyl ether. To the stirred solution 27 parts of N-(δ-aminobutyl)piperidine are gradually added. The reaction mixture is then extracted with dilute hydrochloric acid and the extract is washed with ether, made alkaline and extracted with ether. This ether extract is dried over potassium carbonate, filtered and evaporated to yield the N-(δ-piperidinobutyl)-o-(N'-2,4-dimethylphenyl)-anilinobenzamide as a pale, orange syrup. The product has the structural formula

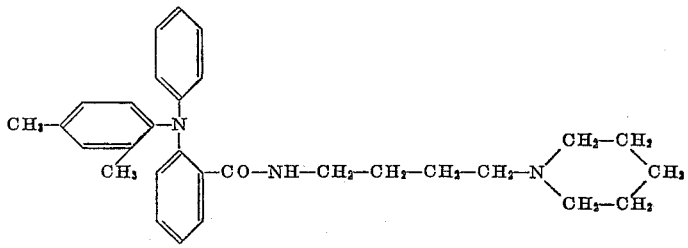

I claim:
1. A compound of the structural formula

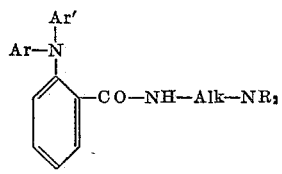

wherein Ar and Ar' are homocyclic mononuclear aryl hydrocarbon radicals containing 6 to 8 carbon atoms, Alk is a lower alkylene radical separating the two nitrogen atoms attached thereto by at least two carbon atoms, and NR₂ is a member of the class consisting of lower dialkylamino radicals and piperidino radicals.

2. A compound of the structural formula

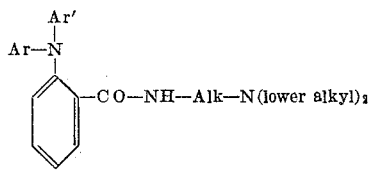

wherein Ar and Ar' are homocyclic mononuclear aryl hydrocarbon radicals containing 6 to 8 carbon atoms, and Alk is a lower alkylene radical separating the two nitrogen atoms attached thereto by at least two carbon atoms.

3. A compound of the structural formula

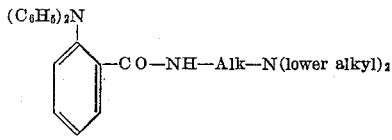

wherein Alk is a lower alkylene radical separating the two nitrogen atoms attached thereto by at least two carbon atoms.

4. A compound of the structural formula

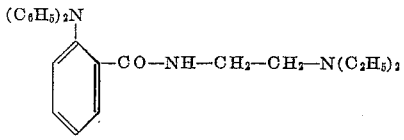

5. A compound of the structural formula

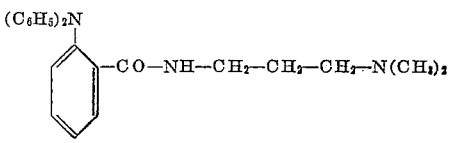

6. A compound of the structural formula

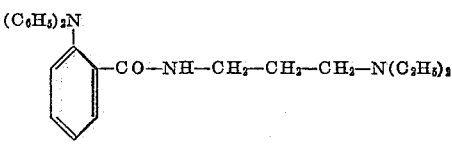

7. A compound of the structural formula

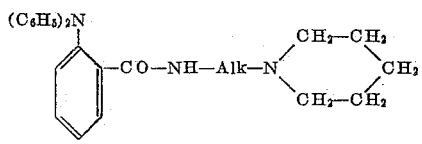

wherein Alk is a lower alkylene radical separating the two nitrogen atoms attached thereto by at least two carbon atoms.

References Cited in the file of this patent
UNITED STATES PATENTS

| | | |
|---|---|---|
| 2,073,100 | Eisleb | Mar. 9, 1937 |
| 2,596,156 | Krimmel | May 13, 1952 |
| 2,671,805 | Krimmel | Mar. 9, 1954 |